March 28, 1950        J. D. GAYER        2,501,936
VARIABLE SPEED DRIVE
Filed March 10, 1949        3 Sheets-Sheet 1
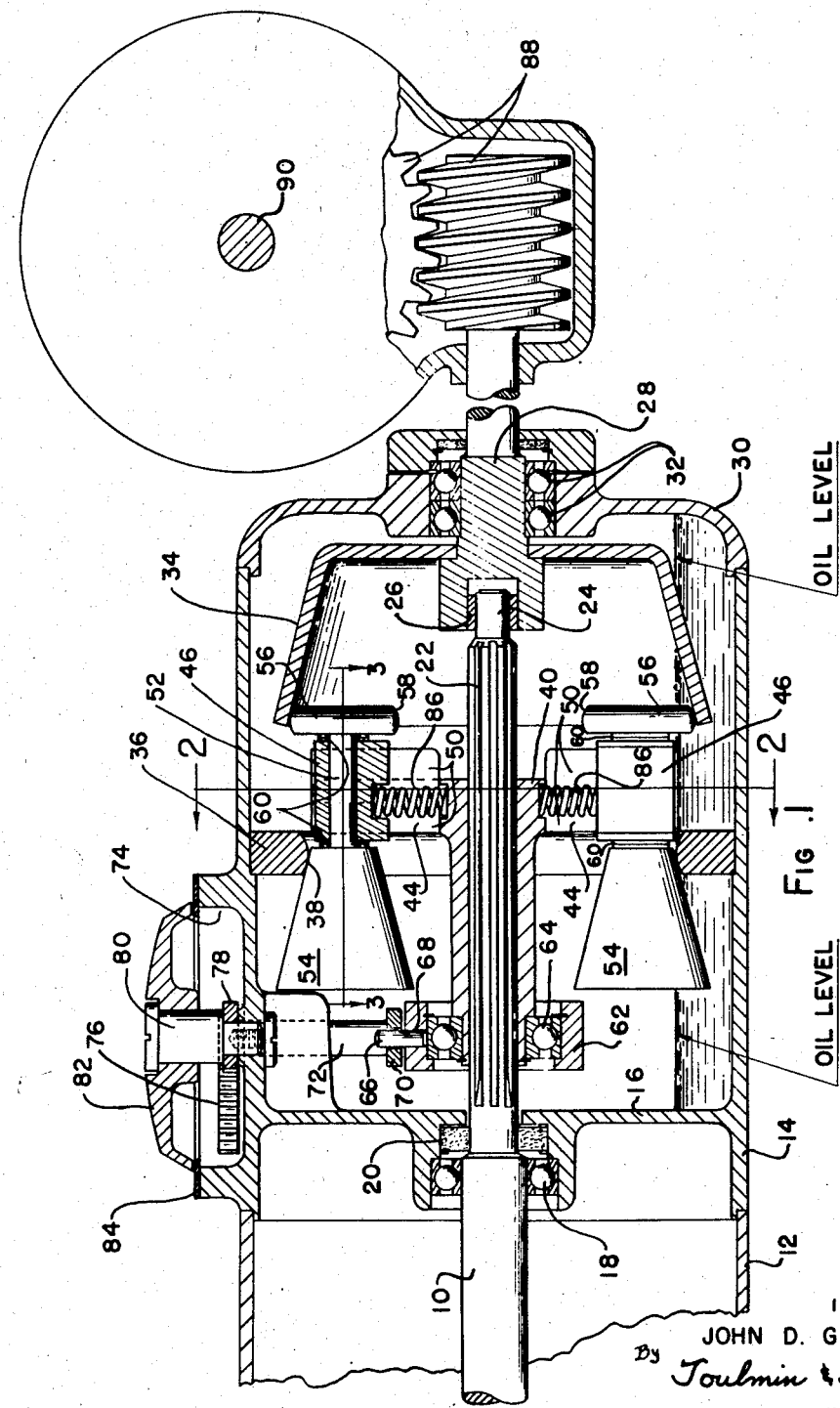
INVENTOR
JOHN D. GAYER
By Toulmin & Toulmin
ATTORNEYS March 28, 1950 J. D. GAYER 2,501,936
VARIABLE SPEED DRIVE
Filed March 10, 1949 3 Sheets-Sheet 2
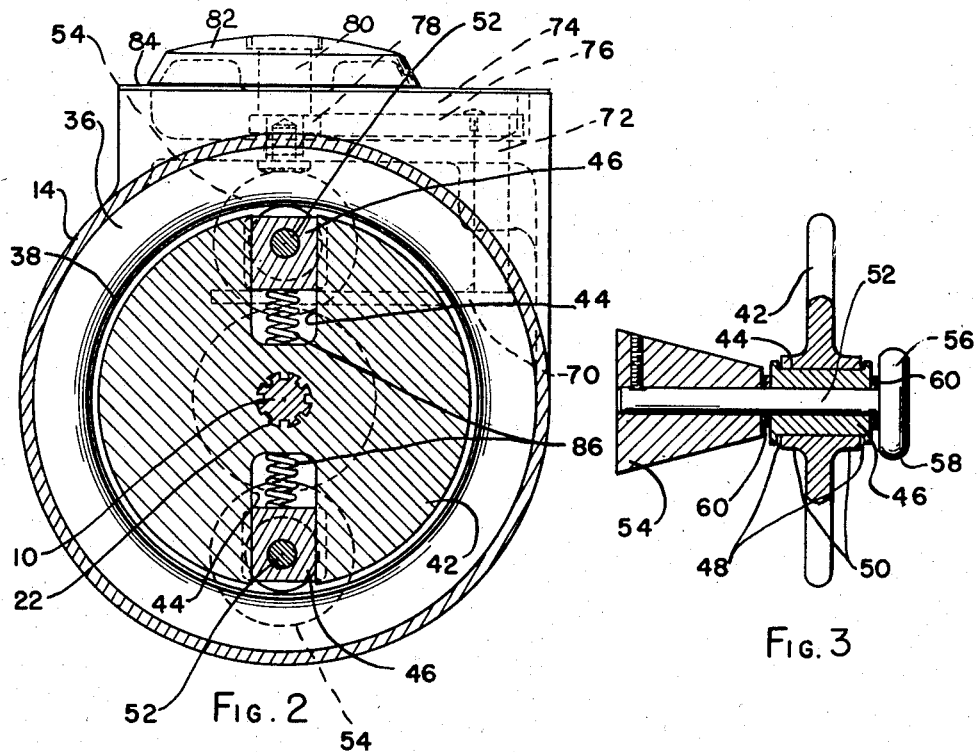
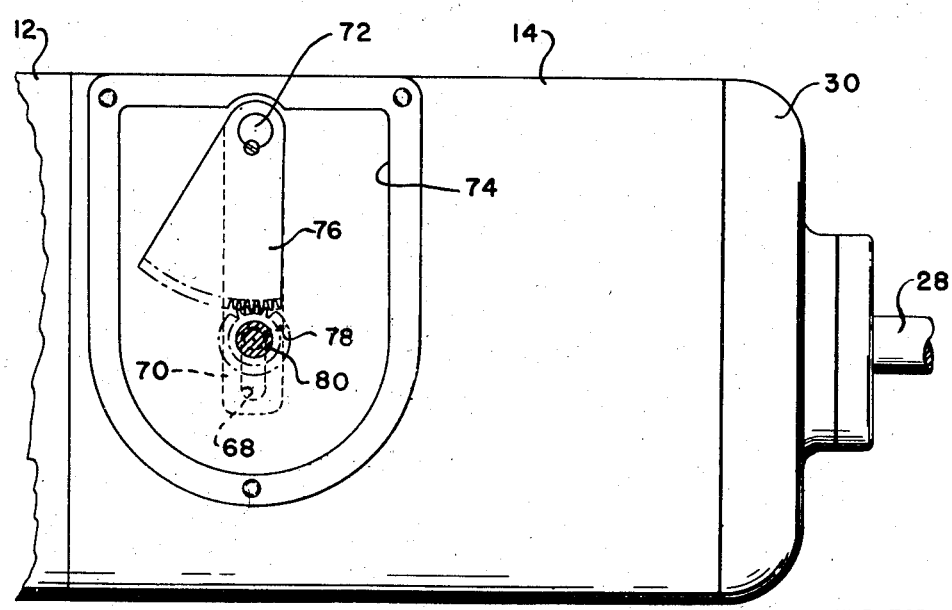
INVENTOR
JOHN D. GAYE
BY Toulmin & Toulmin
ATTORNEYS March 28, 1950     J. D. GAYER     2,501,936
VARIABLE SPEED DRIVE Filed March 10, 1949     3 Sheets-Sheet 3

INVENTOR
JOHN D. GAYER
By Toulmin & Toulmin
ATTORNEYS

Patented Mar. 28, 1950

2,501,936

UNITED STATES PATENT OFFICE 2,501,936

VARIABLE-SPEED DRIVE

John D. Gayer, Dayton, Ohio, assignor to The Brown-Brockmeyer Co., Dayton, Ohio, a corporation of Ohio Application March 10, 1949, Serial No. 80,741

9 Claims. (Cl. 74—796)

This invention relates to variable speed drives, and particularly to such drives especially adapted for use in connection with electric motors and the like as an integral part thereof.

Variable speed drives are widely employed in industry for machine tools, process equipment and other installations. Formerly it was necessary to provide between the source of motive power and the device to be driven at variable speeds, a separate variable speed unit such as a mechanical or hydraulic transmission. More recently variable speed drives have been incorporated in motor structures with the advantageous result of requiring only a single unit for installing the source of power and the variable speed transmission at the time of manufacturing the device to be driven. It is with a unit of this type that this invention is particularly concerned.

Units of this type are generally quite bulky and expensive and are not particularly efficient. Also, they are often difficult to adjust under load and this detracts from their utility and convenience.

Accordingly, the primary object of the instant invention is to provide an improved variable speed drive especially adapted for being constructed integrally with an electric motor.

Another object of this invention is the provision of a variable speed drive unit which is relatively simple and inexpensive to construct.

A still further object is a provision of a variable speed drive unit adapted for being integrally constructed with an electric motor or the like which is easily adjustable throughout its speed range.

Another object is the provision of a variable speed drive including friction elements running together which depends principally on centrifugal force for holding the said elements in driving engagement.

Another object is the provision of a variable speed transmission having co-acting friction elements in which the said elements can readily align with each other in order to maintain driving engagement therebetween at all times.

These and other objects and advantages will become more apparent upon reference to the following description taken in connection with the accompanying drawings in which:

Figure 1 is a vertical longitudinal section through a variable speed transmission according to my invention as it appears mounted on the shaft end of an electric motor;

Figure 2 is a transfer section indicated by the line 2—2 on Figure 1;

Figure 3 is a section indicated by the line 3—3 on Figure 1;

Figure 4 is a plan view looking down on top of the arrangement shown in Figure 1 but with the adjustable control knob removed;

Figure 5:
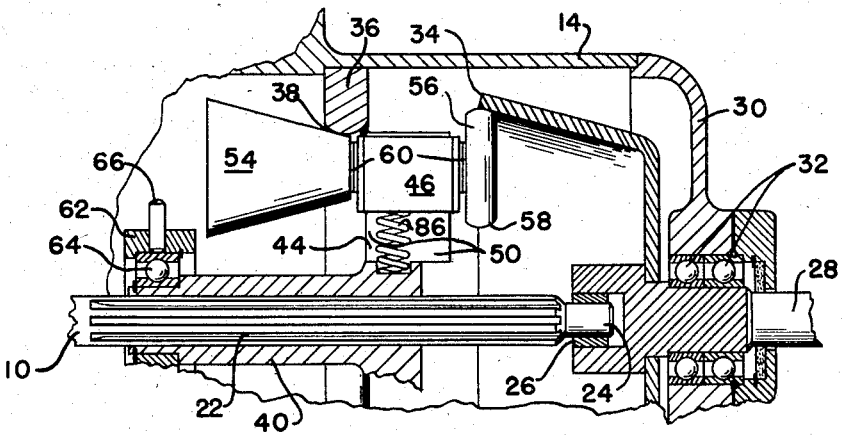
Figures 5, 6 and 7 are fragmentary sectional views of the transmission showing it in three different positions of adjustment.

Referring to the drawings, in Figure 1 the output shaft of a motor is indicated at 10. The motor itself includes a housing part 12 which is abutted by the housing 14 of the variable speed transmission of this invention and into which the shaft 10 extends. Adjacent to the end of the housing 12 the housing 14 has a partition 16 therein which is centrally apertured for receiving the anti-friction bearing 18 supporting the shaft 10 and the seal 20 which isolates the interior of the housing 14 from the interior of the housing 12.

Within the housing 14 the shaft 10 may be somewhat reduced in diameter and splined as at 22. The extreme right end of the shaft 10 as viewed in Figure 1 is reduced in diameter as at 24 for receiving journaling support from a bearing 26. The bearing 26 is carried in the end of an output shaft 28 that extends out through the cover plate 30 mounted on the right end of the housing 14. The anti-friction bearing 32 provides support for the shaft 28.

Mounted on the shaft 28 inside the cover member 30 is a frusto-conical or pan shaped driven member 34. The member 34 is rigidly secured to the shaft 28 to transmit driving torques thereto.

Rigidly mounted in the housing 14 in longitudinally spaced relation with the driven member 34 is a fixed drive ring 36 which has its inner periphery arcuately shaped as indicated at 38.

Slidably mounted on the splined part 22 of the shaft 10 is a block or spider member 40 having a flange extending radially outwardly as will be seen at 42 in Figure 2. The flange 42 is radially slotted at diametrically opposite points as at 44 and reciprocably mounted in the slots 44 are the movable blocks 46.

As will be seen in Figure 3 the blocks 46 are free to move somewhat axially and also to tilt in the plane of the axis of the shaft 10 for the purpose of permitting the driving elements carried thereby to align with the ring 36 and driven member 34. This freedom of movement of the blocks 46 is obtained by providing a small clearance between these blocks and the flange 42 as shown at 48.

In order to save weight and expense the flange 42 may have axially extending ribs as at 50 extending from the edges of the slots 44 in order to form the guide means for the blocks 46 as will be observed in Figure 3.

Extending axially through each of the blocks 46 is a shaft 52 and mounted on each end of the shaft 52 is a friction drive element. The one at the left end of the shaft is of frusto-conical shape and has its side walls in exact parallelism with the walls of the driven member 34. The frusto-conical drive element referred to as indicated is shown at 54. The drive element on the right end of the shaft is indicated at 56 and has its outer periphery arcuately shaped as at 58.

Preferably there are thrust washers 60 between each of the elements 54 and 56 and the blocks 46 through which their supporting shaft extends in order to prevent excessive end play of the said shaft and elements.

It will be observed in Figure 1 that the spacing between the elements 54 and 56 and the difference between their respective diameters is such that the element 54 is in engagement with the drive ring 36 when element 56 is in engagement with driven member 34. It will also be observed that due to the fact that the angle between the sides of the element 54 is the same as that between the sides of the member 34, the blocks 46 can be adjusted longitudinally within the housing 14 and in all positions of adjustment retain the driving engagement between the elements 54 and 56 and the members 38 and 34.

It will also be evident that this axial shifting of the blocks 46 and the elements supported thereby will change the driving ratio between the shaft 10 and the shaft 28.

For so shifting the blocks 46, the block 40 is shiftable on the splined part 22 of the shaft 10 by a collar 62 supported on the left end of the block 40 by the anti-friction bearing 64. A pin 66 is upstanding from one side of the collar and extends into a slot 68 in the end of an arm 70 carried on the lower end of a shaft 72 extending vertically upwardly through the upper wall of housing 14 as will be seen in Figures 1, 2 and 4.

The upper part of the housing 14 is formed with a recess 74 into which the said shaft extends and within the recess and secured to the shaft is a gear sector 76. The toothed periphery of the sector 76 is engaged by a pinion 78 secured to the lower end of a shaft 80 that extends through and is fastened to an adjusting knob 82.

The adjusting knob is positioned to overlie a closure plate 84 that covers the recess 74 and preferably the knob and cover plate carry cooperating indicia by means of which the exact position occupied by the block 40 and the movable blocks 46 supported thereby can be indicated.

In operation, the shaft 10 is driven at, say, 1800 R. P. M. This in turn drives the block 40 and the blocks 46. The friction elements 54 and 56 carried by the blocks 46 are initially urged outwardly into engagement with the ring 36 and member 34 by the compression springs 86. Additional thrust is exerted on the blocks and elements by the centrifugal force due to the rotation thereof. As the shaft 10 and block 40 rotate the element 54 rolls about the periphery of the ring 36 and at a speed determined by the axial position of the block 40. Due to the rigid connection between the elements 56 and 54, the element 56 rotates at the same speed as the element 54.

The peripheral speed of the element 56 is transmitted to the driven member 34 and this in turn drives the output shaft 28. As will be seen in Figure 1, the output shaft 28 can be connected through the worm gearing 88 to drive an output shaft 90 at considerably reduced speed if the requirements of the device being driven so indicate.

Figure 6:
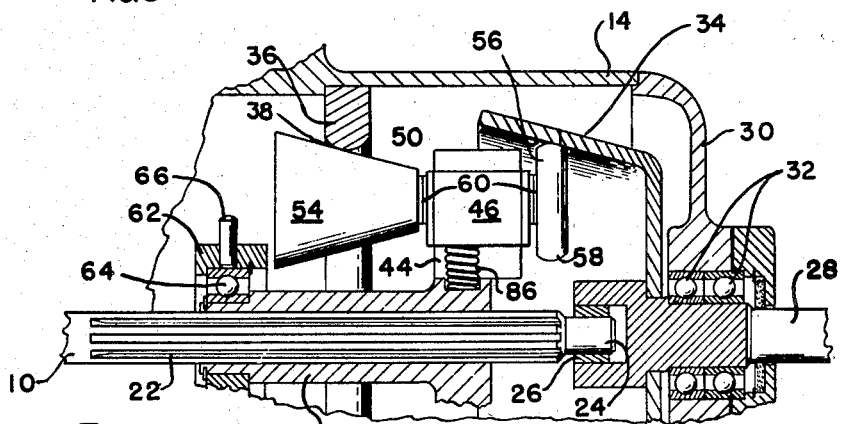
Figure 7:
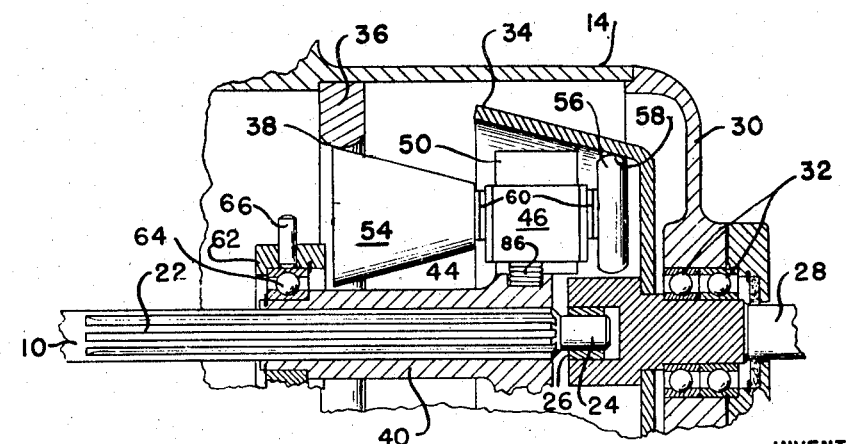

Referring to Figures 5, 6 and 7, the transmission of this invention is shown in three different positions of adjustment. In Figure 5 the output shaft 28 is being driven in the opposite direction to that of the shaft 10 and at considerably reduced speed.

In Figure 6 the output shaft 28 is still running oppositely to the direction of rotation of shaft 10 but at a speed much less than that which it has in Figure 5.

In Figure 7 the direction of rotation of the output shaft has been reversed and it is running in the same direction as shaft 10.

As for the exact manner of calculating the speed and direction of rotation of shaft 28, it can readily be shown that the following formula obtains:

$$N_{28} = N_{10}\left[1 - \frac{R1 r2}{R2 r1}\right]$$

where $N_{28}$ = rotational speed of the output shaft 28
$N_{10}$ = rotational speed of the input shaft 10
$R1$ = effective driving radius of the fixed ring 36
$r1$ = effective driving radius of the element 54
$R2$ = effective driving radius of the driven member 34
$r2$ = effective driving radius of the element 56.

It will be evident that while the arrangement shown in the drawings is a reversible type drive, the direction of rotation of the shaft 28 could be limited to either direction by proper selection of sizes of the various friction members forming the driving connection between shafts 10 and 28. For some purposes a unidirectional variable speed drive is satisfactory while in other cases an arrangement as shown wherein the speed of the output shaft can be varied from a certain amount in one direction through zero to a certain amount in the other direction is more desirable.

It will also be obvious that, while member 34 and elements 54 have been described as conical, frusto-conical, pan shaped, and tapering, the essential thing about them is that their effective radii vary inversely as spider member 40 is shifted along shaft 10. Thus, these parts could be curvilinear in cross-section, if found desirable, and the teachings of my invention would still obtain.

It will further be noted that a number of modifications could be arrived at by merely inverting the parts of the drive, such as by interchanging the ring 36 and member 34, and elements 54 and 56, and it is understood that such modifications come within the purview of this invention.

It will be understood that this invention is susceptible to modification in order to adapt it to different usages and conditions and, accordingly, it is desired to comprehend such modifications within this invention as may fall within the scope of the appended claims.

I claim:

1. In a variable speed transmission; first and second shafts, a friction element having an internal conical surface thereon and mounted on one of said shafts, a friction ring stationary in space, a friction drive means connecting said friction ring and said friction element comprising a friction disc running inside said element and a conical friction member connected therewith and running in said ring, and means connecting said disc and conical member with the other of said shafts, said friction element and friction member including equal angles between their respective walls and tapering in the same direction.

2. In a variable speed transmission having first and second shafts, a block slidably splined on one of said shafts, axially extending shafts carried by said block, a conical drive element on one end of each of said axially extending shafts and a disc on the other ends thereof, a stationary friction ring within which said conical elements run, and a frusto-conical member carried on the other of said first and second shafts and within which said discs run, the included angle between the sides of said frusto-conical member being the same as the included angle between the sides of said conical elements, and said member and elements tapering in the same direction.

3. In a variable speed transmission having input and output shafts; an internal drive ring, a tapering internal drive member axially spaced from said ring, a plurality of circumferentially spaced tapering drive elements running inside said ring, a drive disc associated with each element and running inside said member, a shaft means rigidly connecting each element and its associated disc, carrier means supporting said shaft means on one of said input and output shafts for axial and radial movements relative thereto but preventing circumferential movement relative thereto, one of said ring and member being fixed and the other thereof being carried by the other of said input and output shafts, and said internal drive member and said tapering drive elements all being frusto-conical and tapering in the same direction so axial movement of said carrier means is accompanied by no substantial change in angularity of said shaft means relative to said co-axial shafts.

4. In a variable speed transmission; a housing, a pair of co-axial shafts in said housing, a spider member slidable on one of said shafts, axial shaft means radially shiftable in said spider, tapering drive elements at one end of said shaft means and drive discs at the other end, a fixed ring in which said elements run, a tapering internal drive member on the other of said co-axial shafts in which said discs run, and means operable from externally of said housing for shifting said spider axially of said one shaft, said elements and member all tapering toward the same end of the housing whereby said axial shaft means do not change appreciably in angularity relative to said co-axial shafts during shifting movements of said spider member.

5. In a variable speed transmission; a housing, a pair of co-axial shafts extending into said housing, a radially slotted spider slidably splined on one of said shafts, blocks radially slidable in said slots and shaft means extending through said blocks substantially parallel with said co-axial shafts, tapering drive elements rigidly mounted on said shaft means at one end thereof and drive discs rigidly mounted on said shaft means at the other end thereof, a fixed ring in said housing in which said tapering elements run, a tapering internal drive member on the other of said co-axial shafts in which said discs run, resilient means urging said blocks outwardly to hold said elements and discs in engagement with said ring and member, and means operable from externally of said housing for shifting said spider axially of said shaft for changing the driving ratio between said shafts.

6. In a variable speed transmission; a housing, a pair of co-axial shafts extending into said housing and having their end parts in telescopic engagement, a spider member slidably splined on one of said shafts, said spider member including uniformly circumferentially spaced radial slots, a block radially slidable in each said slot and having limited axial movement in the slot relative to the spider, shaft means extending axially through each said block, tapering drive elements mounted on one end of said shaft means and drive discs on the other end, a fixed ring in said housing surrounding said elements, a tapering internal drive member on the other of said co-axial shafts surrounding said discs, the included angle between the walls of said member being equal to the included angle between the walls of each said element, resilient means acting between said spider and blocks for urging the latter radially outwardly, and means operable from externally of said housing for shifting said spider member axially along its supporting shaft.

7. In a variable speed transmission; a housing, a pair of co-axial shafts extending into said housing and having their end parts in telescopic engagement, a spider member slidably splined on one of said shafts, said spider member including uniformly circumferentially spaced radial slots, a block radially slidable in each said slot and having limited freedom of tilting movement in the plane of said co-axial shafts in the slot relative to the spider, shaft means extending axially through each said block, frusto-conical drive elements mounted on one end of said shaft means and drive discs on the other end, a fixed ring in said housing surrounding said elements, a frusto-conical internal drive member on the other of said co-axial shafts surrounding said discs, the included angle between the walls of said member being equal to the included angle between the walls of said elements, resilient means acting between said spider and blocks for urging the latter radially outwardly, and means operable from externally of said housing for shifting said spider member axially along its supporting shaft.

8. In a variable speed transmission; a housing, a pair of co-axial shafts extending into said housing and having their end parts journaled together in telescopic engagement, a spider member slidably splined on one of said shafts, said spider member including uniformly circumferentially spaced radial slots, a block radially slidable in each said slot and having limited freedom of tilting movement in the plane of said co-axial shafts in the slot relative to the spider, shaft means extending axially through each said block, frusto-conical drive elements mounted on one end of said shaft means and drive discs on the other end, a fixed ring in said housing surrounding said elements, a frusto-conical internal drive member on the other of said co-axial shafts surrounding said discs, the walls of said member including therebetween the same angle as the walls of said elements, compression springs acting radially outwardly between said spider and blocks for urging the latter radially outwardly, and means operable from externally of said housing for shifting said spider member axially along its supporting shaft, said means including a control shaft extending into said housing, an arm on said shaft internally of said housing engaging said spider, a gear sector on said control shaft externally of said housing, a pinion meshing with said sector and an adjusting knob secured to said pinion.

9. In a variable speed transmission; a housing and a pair of co-axial shafts extending into said housing from opposite ends, a spider member slidably splined on one of said shafts, a plurality of circumferentially spaced shaft means carried by said spider member, said shaft means being parallel with said co-axial shafts and being radially slidable in said spider member but restrained therein against any substantial axial movement, frusto-conical drive elements on one end of said shaft means and drive discs on the other end, a drive ring fixed in said housing and surrounding said elements, and a frusto-conical internal drive member surrounding said discs and secured to the other of said co-axial shafts, the inner periphery of said drive ring and the outer peripheries of said discs being arcuate in cross-section, and resilient means urging said shaft means radially outwardly said frusto-conical drive elements and said frusto-conical drive member all tapering in the same direction, whereby said shaft means remain parallel during all adjustments axially of said spider member.

JOHN D. GAYER.

REFERENCES CITED

The following references are of record in the file of this patent:

UNITED STATES PATENTS

| Number | Name | Date |
| --- | --- | --- |
| 464,895 | Riddell | Dec. 8, 1891 |
| 1,370,080 | Ahond | Mar. 1, 1921 |
| 2,203,636 | Schmitter | June 4, 1940 |
| 2,405,957 | Jones | Aug. 20, 1946 |

FOREIGN PATENTS

| Number | Country | Date |
| --- | --- | --- |
| 655,822 | Germany | Jan. 24, 1938 |